(12) United States Patent
Alriksson et al.

(10) Patent No.: US 12,250,170 B2
(45) Date of Patent: *Mar. 11, 2025

(54) SSB TRANSMISSIONS IN UNLICENSED SPECTRUM

(71) Applicant: Telefonaktiebolaget LM Ericsson (publ), Stockholm (SE)

(72) Inventors: Peter Alriksson, Hörby (SE); Stephen Grant, Pleasanton, CA (US); Gen Li, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,085

(22) Filed: Apr. 18, 2023

(65) Prior Publication Data

US 2023/0254084 A1 Aug. 10, 2023

Related U.S. Application Data

(63) Continuation of application No. 17/267,358, filed as application No. PCT/EP2019/071180 on Aug. 7, 2019.

(Continued)

(51) Int. Cl.
*H04L 5/00* (2006.01)
*H04L 27/26* (2006.01)
(Continued)

(52) U.S. Cl.
CPC ......... *H04L 5/0048* (2013.01); *H04W 56/001* (2013.01); *H04W 72/30* (2023.01); *H04W 74/0816* (2013.01); *H04L 27/2613* (2013.01)

(58) Field of Classification Search
CPC ... H04L 5/0073; H04L 27/261; H04L 1/1614; H04L 5/0051; H04L 5/10; H04L 5/0053;
(Continued)

(56) References Cited

U.S. PATENT DOCUMENTS 12,058,624 B2 8/2024 Matsumura et al.
2016/0227476 A1 8/2016 Yerramalli et al.
(Continued)

FOREIGN PATENT DOCUMENTS

WO 2015088951 A1 6/2015
WO 2016123037 A1 8/2016

OTHER PUBLICATIONS

International Search Report and Written Opinion dated Nov. 12, 2019 for International Application No. PCT/EP2019/071180 filed on Aug. 7, 2019, consisting of 9-pages.
(Continued)

*Primary Examiner* — Yee F Lam
(74) *Attorney, Agent, or Firm* — Weisberg I.P. Law, P.A.

(57) ABSTRACT

A method is implemented in a wireless transceiver device arranged to operate in a cellular wireless communication network and capable of operating in an unlicensed spectrum where listen-before-talk is employed. The method includes determining a first parameter, for the unlicensed operation, indicative on provision of synchronisation signal blocks, and determining quasi-co-location, QCL, relationship between one or more synchronisation signal and physical broadcast channel, SS/PBCH, blocks each having a first index, by determining a second index for the one or more SS/PBCH blocks by applying a modulo operation on the first index, respectively, based on the first parameter, where the QCL relationship is determined to occur if the second indices coincide. A computer program for implementing the method in a wireless transceiver and such a transceiver are also disclosed.

22 Claims, 4 Drawing Sheets

Related U.S. Application Data

(60) Provisional application No. 62/717,090, filed on Aug. 10, 2018.

(51) Int. Cl.
  *H04W 56/00* (2009.01)
  *H04W 72/30* (2023.01)
  *H04W 74/0816* (2024.01)

(58) Field of Classification Search
  CPC ...... H04L 5/001; H04L 5/0048; H04W 76/27; H04W 56/001; H04W 24/10; H04W 68/02; H04W 68/06; H04W 74/0833; H04W 68/025; H04W 48/10; H04W 88/02; H04B 17/318
  See application file for complete search history.

(56) References Cited

U.S. PATENT DOCUMENTS

| | | |
|---|---|---|
| 2018/0220442 A1 | 8/2018 | Urabayashi et al. |
| 2018/0368186 A1 | 12/2018 | Gu et al. |
| 2018/0376438 A1 | 12/2018 | Islam et al. |
| 2019/0021062 A1 | 1/2019 | Abedini et al. |
| 2019/0037481 A1* | 1/2019 | Zhang ............... H04L 5/0032 |
| 2019/0052337 A1 | 2/2019 | Kwon et al. |
| 2019/0191457 A1* | 6/2019 | Si ........................ H04L 5/0082 |
| 2019/0297577 A1 | 9/2019 | Lin et al. |
| 2019/0313461 A1 | 10/2019 | Jung et al. |
| 2020/0015214 A1 | 1/2020 | Si et al. |
| 2020/0022108 A1 | 1/2020 | Chen et al. |
| 2020/0029238 A1 | 1/2020 | Si et al. |
| 2020/0053781 A1 | 2/2020 | Pan et al. |
| 2020/0120634 A1 | 4/2020 | Lee et al. |
| 2020/0154341 A1 | 5/2020 | Sun et al. |
| 2020/0187302 A1* | 6/2020 | Si ........................ H04W 88/06 |
| 2020/0267730 A1 | 8/2020 | Kim et al. |
| 2020/0288333 A1 | 9/2020 | Takeda et al. |
| 2020/0288334 A1 | 9/2020 | Takeda et al. |
| 2020/0413356 A1* | 12/2020 | Wang ............... H04W 56/001 |
| 2021/0006443 A1 | 1/2021 | Morozov et al. |
| 2021/0235419 A1* | 7/2021 | Si ........................ H04W 72/53 |
| 2022/0078686 A1 | 3/2022 | Yiu |
| 2022/0132524 A1 | 4/2022 | Mueck et al. |
| 2022/0183064 A1 | 6/2022 | Talarico et al. |
| 2022/0216929 A1 | 7/2022 | Matsumura et al. |
| 2022/0231810 A1 | 7/2022 | Matsumura et al. |

OTHER PUBLICATIONS

3GPP TSG RAN WG1 Meeting NR#3 R1-1715565; Title: On QCL indication and time repetition of SS blocks; Agenda Item: 6.1.6; Source: Huawei, HiSilicon; Document for: Discussion and Decision; Location and Date: Nagoya, Japan, Sep. 18-21, 2017, consisting of 2-pages.

3GPP TSG RAN WG1 Meeting #90 R1-1715212; Title: WF on SS block QCL Indication; Agenda Item: 6.1.1.1.1; Source: ZTE, Qualcomm, InterDigital, MediaTek, Sierra Wireless; Document for: Discussion and Decision; Location and Date: Prague, Czechia, Aug. 21-25, 2017, consisting of 2-pages.

3GPP TSG-RAN WG1 Meeting #95 R1-1813459; Title: On initial access, RRM, mobility and RLM; Agenda Item: 7.2.2.4.2; Source: Ericsson; Document for: Discussion, Decision; Location and Date: Spokane, USA, Nov. 12-16, 2018, consisting of 15-pages.

3GPP TS 38.213 V15.2.0 3rd Generation Partnership Project; Technical Specification Group Radio Access Network; NR; Physical layer procedures for control (Release 15), Jun. 2018, consisting of 99-pages.

3GPP TSG-RAN WG1 Meeting AH#1901 R1-1900999; Title: Enhancements to initial access procedure; Agenda Item: 7.2.2.2.2; Source: Ericsson; Document for: Discussion, Decision; Location and Date: Taipei, Taiwan, Jan. 21-25, 2019, consisting of 12-pages.

3GPP TSG-RAN WG1 Meeting #94 R1-1809205; Title: On initial access, RRM, mobility and RLM; Agenda Item: 7.2.2.4.2; Source: Ericsson; Document for: Discussion, Decision; Location and Date: Gothenburg, Sweden, Aug. 20-24, 2018, consisting of 9-pages.

3GPP TSG-RAN WG1 Meeting #94bis R1-1811302; Title: On initial access, RRM, mobility and RLM; Agenda Item: 7.2.2.4.2; Source: Ericsson; Document for: Discussion, Decision; Location and Date: Chengdu, China, Oct. 8-12, 2018, consisting of 9-pages.

3GPP TSG-RAN WG1 Meeting #96 R1-1902884; Title: Enhancements to initial access procedure; Agenda Item: 7.2.2.2.2; Source: Ericsson; Document for: Discussion, Decision; Location and Date: Athens, Greece, Feb. 25-Mar. 1, 2019, consisting of 13-pages.

3GPP TSG-RAN WG1 Meeting #96b R1-1904336; Title: Enhancements to initial access procedure; Agenda Item: 7.2.2.2.2; Source: Ericsson; Document for: Discussion, Decision; Location and Date: Xi'an, China, Apr. 8-12, 2019, consisting of 15-pages.

3GPP TSG-RAN WG1 Meeting #97 R1-1907455; Title: Enhancements to initial access procedure; Agenda Item: 7.2.2.2.2; Source: Ericsson; Document for: Discussion, Decision; Location and Date: Reno, USA, May 13-17, 2019, consisting of 14-pages.

Indian Office Action dated Jan. 27, 2022 for Patent Application No. 202147009305, consisting of 6-pages.

International Search Report and Written Opinion dated Jan. 20, 2021 for International Application No. PCT/EP2020/076611 filed Sep. 23, 2020, consisting 11 pages.

3GPP TSG-RAN WG1 Meeting #98 R1-1909299; Title: Enhancements to initial access procedure; Agenda Item: 7.2.2.2.2; Source: Ericsson; Document for: Discussion, Decision; Location and Date: Prague, CZ, Aug. 26-30, 2019, consisting of 16 pages.

3GPP TS 38.213 V15.6.0 3rd Generation Partnership Project; Technical Specification Group Radio Access Network; NR; Physical layer procedures for control (Release 15), Jun. 2019, consisting of 107-pages.

Taiwan Office Action with English Summary Translation dated May 8, 2020 for Patent Application No. 108128370, consisting of 13-pages.

3GPP TSG-RAN WG2#101bis R2-1804536; Title: Discussion on Impact of LBT to Minimum System Information for NR-U; Agenda Item: 11.2; Source: OPPO; Document for: Discussion and decision; Date and Location: Apr. 16-20, 2018, consisting of 4-pages.

3GPP TSG-RAN WG2#101bis Tdoc R2-1806347; Title: Proposal to progress LTE_Aerial-Core; Agenda Item: 9.18.1; Source: Ericsson; Document for: Discussion, Decision; Date and Location: Apr. 16-20, 2018, consisting of 9-pages.

Notice of Allowance dated Aug. 15, 2024 for U.S. Appl. No. 17/761,004, consisting of 36 pages.

* cited by examiner

SSB TRANSMISSIONS IN UNLICENSED SPECTRUM

CROSS-REFERENCE TO RELATED APPLICATIONS

This application is continuation of U.S. application Ser. No. 17/267,358 filed Feb. 9, 2021, which is a U.S. National Stage Patent Application of International Application No.: PCT/EP2019/071180, filed Aug. 7, 2019, which claims priority to U.S. Provisional Application No. 62/717,090, filed Aug. 10, 2018, the entireties of all of which are incorporated herein by reference.

TECHNICAL FIELD

The present disclosure generally relates to a method implemented in a wireless transceiver device arranged to operate in a cellular wireless communication network and capable of operating in an unlicensed spectrum where listen-before-talk, LBT, is employed, such a wireless transceiver device and a computer program for implementing the method in the wireless transceiver device. In particular, the present disclosure relates to handling shifted synchronisation signal and physical broadcast channel, SS/PBCH, blocks which occur when operating in unlicensed spectrum where LBT is employed.

BACKGROUND

Abbreviations

SSB Synchronization Signal Block
PSS Primary Synchronization Signal
SSS Secondary Synchronization Signal
PBCH Physical Broadcast Channel
SS Synchronization Signal
UE User Equipment
LSB Least Significant Bit
Rx Receiver/Reception
DM-RS Demodulation Reference Signal
RACH Random Access Channel
PRACH Physical Random Access Channel
RRM Radio Resource Management
RSRP Reference Signal Received Power
SMTC SSB Measurement Time Configuration
CSI-RS Channel State Information Reference Signal
LBT Listen Before Talk
LAA Licensed-Assisted Access
DRS Discovery Reference Signal
DMTC Discovery Measurement Timing Configuration
NR New Radio
NR-U NR Unlicensed
FR1, FR2 Frequency Range 1, Frequency Range 2
QCL Quasi-Co-Location
RRC Radio Resource Control
MIB Master Information Block
SIB System Information Block
RMSI Remaining Minimum System Information
gNB gNodeB (base station in NR)

NR defines two types of synchronization signals; PSS and SSS and one broadcast channel; PBCH. Further PSS, SSS and PBCH are transmitted in one SS/PBCH block. One or multiple SS/PBCH block(s) can be transmitted within one SS/PBCH period. For a half frame with SS/PBCH blocks, the first symbol indexes for candidate SS/PBCH blocks are determined according to the subcarrier spacing of SS/PBCH blocks as described in 3GPP TS 38.213, v15.2.0.

The candidate SS/PBCH blocks in a half frame are indexed in an ascending order in time from 0 to L−1. A UE determines the 2 LSB bits, for L=4, or the 3 LSB bits, for L>4, of a SS/PBCH block index per half frame from a one-to-one mapping with an index of the DM-RS sequence transmitted in the PBCH. For L=64, the UE determines the 3 MSB bits of the SS/PBCH block index per half frame by PBCH payload bits. In addition, a half-frame indicator is present in the PBCH payload bits.

The UE may assume that SS/PBCH blocks transmitted with the same block index on the same centre frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

The SS/PBCH block index is used in for different purposes:

Frame Timing Establishment
  By determining the SS/PBCH block index (from the DM-RS sequence and PBCH payload), the half-frame indicator (from the PBCH payload) and the first symbol index of SS/PBCH blocks (from the specification) the UE can establish the start of the radio frame.

RACH Procedure
  A UE is provided a number N of SS/PBCH blocks associated with one PRACH occasion and a number R of contention-based preambles per SS/PBCH block by higher layer parameter ssb-perRACH-OccasionAndCB-PreamblesPerSSB. If N<1, one SS/PBCH block is mapped to 1/N consecutive PRACH occasions. If, N>=1, R contention-based preambles with consecutive indexes associated with SS/PBCH block n, 0<=n<=N−1, per PRACH occasion start from preamble index n*64/N. SS/PBCH block indexes are mapped to PRACH occasions in the following order:
  First, in increasing order of preamble indexes within a single PRACH occasion.
  Second, in increasing order of frequency resource indexes for frequency multiplexed PRACH occasions.
  Third, in increasing order of time resource indexes for time multiplexed PRACH occasions within a PRACH slot.
  Fourth, in increasing order of indexes for PRACH slots.
  Thus, to summarize there is a mapping from SS/PBCH block index to preamble and/or PRACH occasion.

RRM Measurements
  SS reference signal received power (SS-RSRP) is defined as the linear average over the power contributions (in [W]) of the resource elements that carry secondary synchronization signals (SS). The measurement time resource(s) for SS-RSRP are confined within SS/PBCH Block Measurement Time Configuration (SMTC) window duration.
  SS-RSRP shall be measured only among the reference signals corresponding to SS/PBCH blocks with the same SS/PBCH block index and the same physical-layer cell identity.

Radio Link Monitoring
  A UE can be configured with a set of resource indexes, through a corresponding set of higher layer parameters RadioLinkMonitoringRS, for radio link monitoring by higher layer parameter failureDetectionResources. The UE is provided by higher layer parameter RadioLink- MonitoringRS, with either a CSI-RS resource configuration index, by higher layer parameter csi-RS-Index, or a SS/PBCH block index, by higher layer parameter ssb-Index.

This disclosure particularly concerns operation in unlicensed spectrum. In unlicensed spectrum, transmissions are often (depending on regulation) subject to LBT, thus access to the medium cannot be guaranteed. To mitigate this problem the transmitter is often given a window in which transmissions can occur instead of fixed time locations. For example, in Rel-13 LAA the discovery reference signal (DRS) is allowed to move in the discovery measurement timing configuration window (DMTC).

Similar approaches have been proposed for the SS/PBCH block for NR-U, where multiple SS/PBCH blocks are grouped together and referred to as a DRS. In Rel-15 NR the maximum number for the SS/PBCH block index is 8 for FR1 (<=6 GHz) and 64 for FR2 (>6 GHz).

To allow the UE to be able to determine the frame timing when the SS/PBCH block shifts in time while still allowing other procedures such as RRM measurements, radio link monitoring and random access to function as closely as possible to licensed NR, a new solution is required.

The above information disclosed in this Background section is only for enhancement of understanding of the background of the disclosure and therefore it may contain information that does not form the prior art that is already known to a person of ordinary skill in the art.

SUMMARY

The disclosure is based on the inventors' understanding that the time position of the shifted SS/PBCH block is indicated by the detected SS/PBCH index, either directly or indirectly through other parameters, and making use of both the PBCH DM-RS sequence and reserved bits in the PBCH payload enables to signal more than the 8 SS/PBCH indexes that are available for FR1 (<6 GHz) in Rel-15 NR. The inventors propose that the UE uses an effective SS/PBCH index which is computed by a modulo operation on the detected SS/PBCH index instead of the detected SS/PBCH index in all procedures except when determining the frame timing.

According to a first aspect, there is provided a method implemented in a wireless transceiver device arranged to operate in a cellular wireless communication network and capable of operating in an unlicensed spectrum where listen-before-talk is employed. The method comprises determining a first parameter, for the unlicensed operation, indicative on provision of synchronisation signal blocks, and determining quasi-co-location, QCL, relationship between one or more synchronisation signal and physical broadcast channel, SS/PBCH, blocks each having a first index, by determining a second index for the one or more SS/PBCH blocks by applying a modulo operation on the first index, respectively, based on the first parameter, where the QCL relationship is determined to occur if the second indices coincide.

The determining of the first parameter may comprise receiving the first parameter. The method may comprise determining the frame timing based on the first index associated with a detected SS/PBCH block.

The determining of the first index may comprise receiving at least a part of the first index from a Physical Broadcast Channel, PBCH, payload. The determining of the first index may comprise receiving at least a part of the first index implicitly from the identifier of a reference signal sequence associated with the Physical Broadcast Channel.

The determining of the parameter may comprise receiving at least a part of the parameter from a System Information Block, SIB. The at least part of the first parameter may be conveyed in a field used for ssb-PositionInBurst of a ServingCellConfigCommonSIB.

The receiving of the indication of the number may comprise receiving the number from a Master Information Block, MIB or PBCH payload, or a combination of the two.

The determining of the first parameter may comprise receiving the first parameter through user-specific Radio Resource Control signalling.

The determining of the QCL relationship may comprise determining one or more desired second index(es) from transmission history, determining second index for a received SS/PBCH block as the first index modulo the first parameter, and comparing the second indices.

The method may comprise determining a QCL shift indicator, and wherein the determining of the QCL relationship may comprise determining one or more desired second index(es) from transmission history, determining second index for a received SS/PBCH block as the first index modulo the first parameter minus the determined QCL shift when the second index becomes positive and as the first index modulo the first parameter minus the determined QCL shift plus the first parameter otherwise, and comparing the second indices. The determining of the QCL shift indicator may comprise receiving the QCL shift indicator through user-specific Radio Resource Control signalling. The determining of the QCL shift indicator may comprise receiving the QCL shift indicator through broadcast system information.

The method may comprise receiving an indication of a number of transmitted SS/PBCH blocks per burst. The receiving of the indication of the number may comprise receiving the number from a System Information Block, SIB. The number may be conveyed in a field used for ssb-PositionInBurst of a ServingCellConfigCommonSIB. The receiving of the indication of the number may comprise receiving the number from a Master Information Block, MIB or PBCH payload, or a combination of the two. Alternatively, the receiving of the indication of the number may comprise receiving the number M through user-specific Radio Resource Control signalling.

According to a second aspect, there is provided a computer program comprising instructions which, when executed on a processor of a wireless transceiver device, causes the wireless transceiver device to perform the method according to the first aspect.

According to a third aspect, there is provided a wireless transceiver device arranged to operate in a cellular wireless communication network and capable of operating in an unlicensed spectrum where listen-before-talk is employed. The wireless transceiver device comprises a transceiver arranged to receive and transmit signals, including receiving synchronisation signals and control signals, and a signal handling circuit arranged to perform the method according to the first aspect.

An advantage of some embodiments is that the UE can determine the frame timing of the cell using legacy-like mechanisms, thus providing a solution without increasing the complexity of procedures such as RRM measurements, RLM and RACH that relies on the detected SS/PBCH index.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

Figure 1:
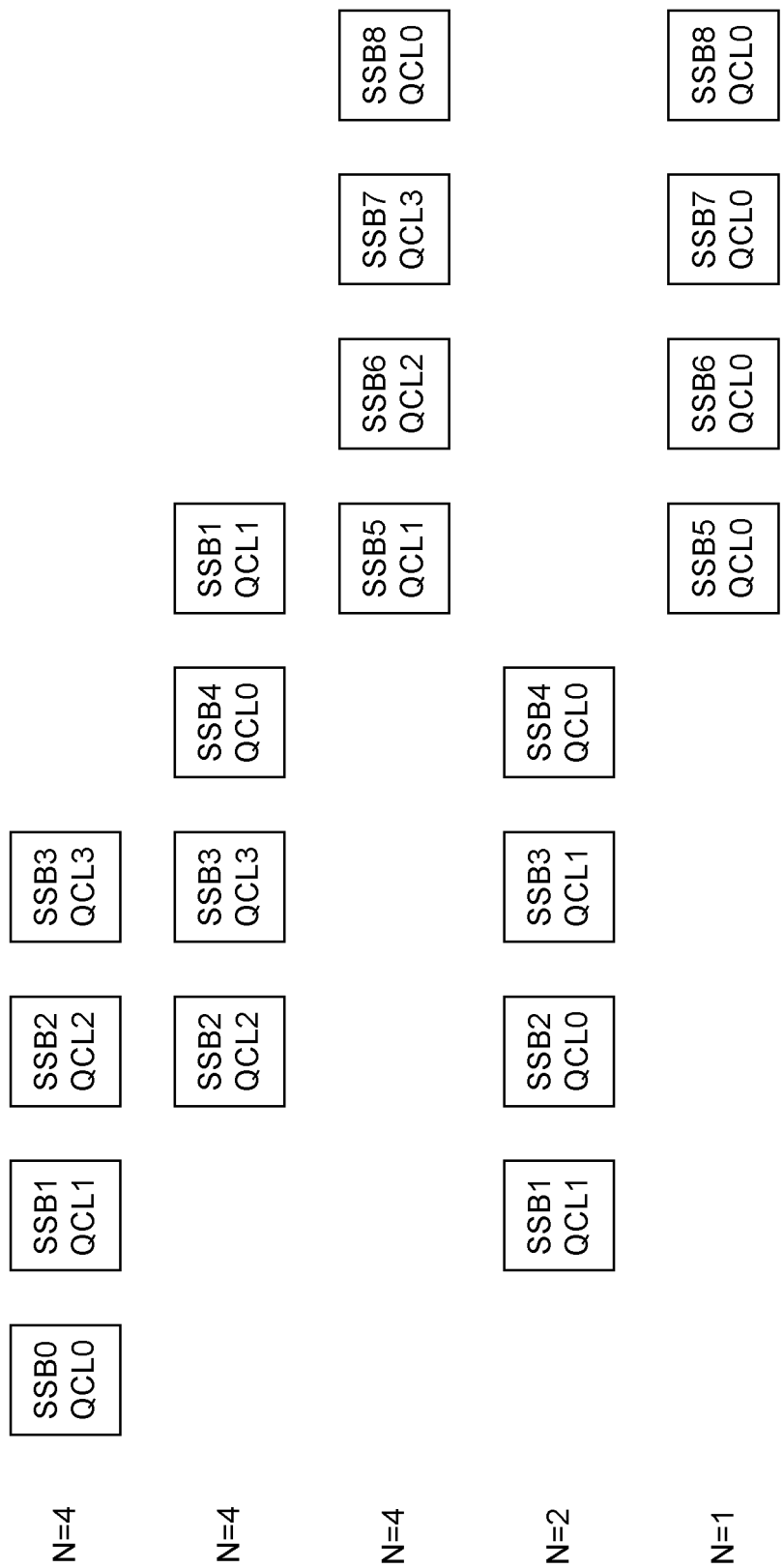
FIG. 1 schematically illustrates examples of different SS/PBCH positions and their respective SS/PBCH block indices and QCL indices.

The time position of the shifted SS/PBCH block is indicated by the detected SS/PBCH index. Making use of both the PBCH DM-RS sequence and reserved bits in the PBCH payload to signal more than the 8 SS/PBCH indexes that are available for FR1 (<6 GHz) in Rel-15 NR, even though 8 or less SS/PBCH blocks are transmitted.

The previously reserved PBCH payload bits (see TS 38.212) used to signal the SS/PBCH index are bits $\bar{a}_{\bar{A}+6}$, $\bar{a}_{\bar{A}+7}$ in case 32 indexes are sufficient and $\bar{a}_{\bar{A}+5}$, $\bar{a}_{\bar{A}+6}$, $\bar{a}_{\bar{A}+7}$ if 64 indexes are required.

Because there are two SS/PBCH block positions in each slot, 64 indices cover 32 slots, which corresponds to 32, 16 and 8 ms for 15, 30 and 60 kHz subcarrier spacing respectively. Thus, using a subset of the available 64 indices any SS/PBCH block position within a half-frame can be addressed. For 15, 30 and 60 kHz SCS, 10, 20 and 40 indices respectively are sufficient to cover 5 ms.

The value of the SS/PBCH index is reset to 0 every 5 ms (=half-frame). For example, for 30 kHz subcarrier spacing the value will range from 0 to 19 (because there are 20 SS/PBCH positions per 5 ms).

In one embodiment the UE computes an effective SS/PBCH block index as the detected SS/PBCH block index modulo N. This effective SS/PBCH block index is then used instead of the detected SS/PBCH block index (e.g. ranging 0 to 19 for 30 kHz SCS) except for when determining the frame timing (then the detected SS/PBCH index is used according to prior art). In other words the parameter N tells the UE that not only is SS/PBCH blocks with the same index QCL with each other, but also SS/PBCH blocks with index n1 and n2 fulfilling mod(n1,N)=mod(n2,N).

The parameter N may for example be provided in a SIB. Alternatively, the parameter N may be provided through RRC messaging.

FIG. 1 schematically illustrates examples of different SS/PBCH positions and their respective SS/PBCH block indices and QCL indices. In FIG. 1, several examples are shown for different values of N assuming a DRS with 4 SS/PBCH blocks. Note that basic repetition can be achieved with N=1. QCLx denotes the effective SS/PBCH block index and indicates which SS/PBCH blocks that are QCL with each other. This provides the UE with the information it requires in order to determine on which SS/PBCH blocks it may include in its RRM and RLM measurements. In addition, it preserves the association between SS/PBCH blocks and PRACH occasions that are configured to the UE irrespective of a potential time shift of the DRS due to LBT.

For example, assuming 20 candidate positions to transmit SS/PBCH block for 30 kHz SCS and only maximum 4 is transmitted. So the transmitted SS/PBCH block index in DRS could be (0,1,2,3), (1,2,3,4) . . . (2,3,4,5) . . . . Assuming one UE detects SSB0 in the first DRS occasion and enters RRC_CONNECTED mode. Later, this UE will rely on SSB0 for RLM and RRM measurements. However in next DRS occasion, SSB0 is not transmitted due to LBT failure and the DRS contains SSB(1,2,3,4). In this case, this UE cannot monitor and make measurement anymore since the specification states that measurements shall be made only among the reference signals corresponding to SS/PBCH blocks with the same SS/PBCH block index. In this disclosure, it is provided a method to inform the UE that a time shifted SS/PBCH block (due to LBT) with a different SS/PBCH block index is still QCL'd with SSB0, so the UE associated with SSB0 first could still use the later detected SS/PBCH block with a different index for RLM and RRM measurements.

In NR, there is a parameter ssb-PositionsInBurst which is a bitmap specifying which SS/PBCH blocks that are transmitted. For NR-U, because the SS/PBCH blocks are allowed to move in time, such a bitmap does not convey any useful information. Instead it is proposed in this disclosure to reuse the bits for signalling the value of N.

In another embodiment the value of N divides the number of SS/PBCH block positions per 5 ms (=half-frame). For example, for 30 kHz subcarrier spacing, the number of SS/PBCH block positions per 5 ms is 20 (10 slots per 5 ms and 2 SS/PBCH block positions per slot), and thus N can take the value of N=1, 2, 4, 5, 10, 20.

Figure 2:
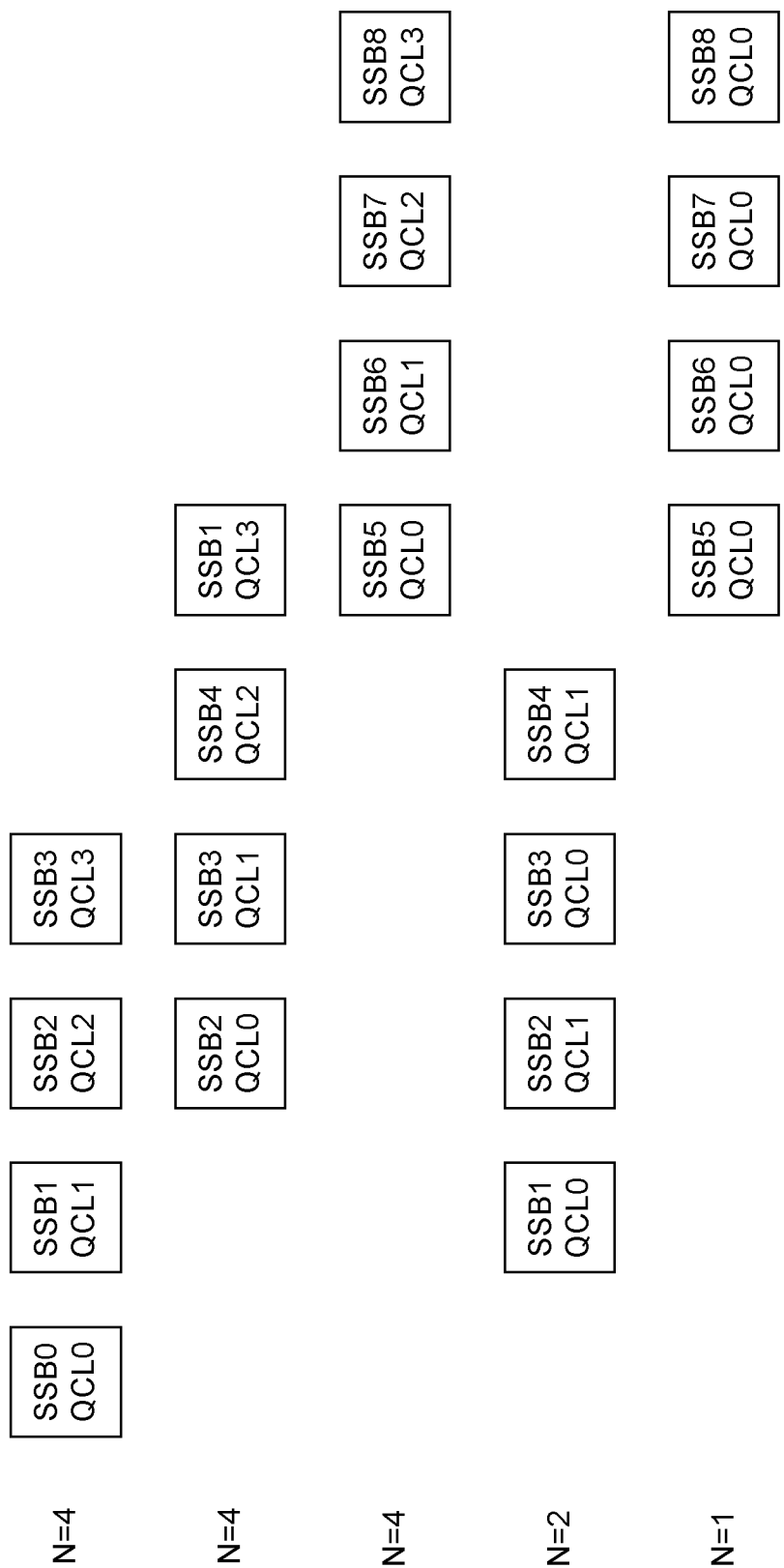
FIG. 2 schematically illustrates examples of different SS/PBCH positions and their respective SS/PBCH block indices and QCL indices.

FIG. 2 schematically illustrates examples of different SS/PBCH positions and their respective SS/PBCH block indices and QCL indices. For a signalled SS/PBCH block index n, the UE computes an effective SS/PBCH block index I as I=mod(n,N)−Q if I≥0 or I=mod(n,N)−Q+N if I according to above is negative.

Here Q is a signalled QCL shift indicator computed at the gNB as $$Q = \mathrm{mod}(n1, N)$$

where n1 is the first index, e.g. SS/PBCH BLOCK index, in the DRS burst that is signalled. The QCL shift indicator Q has a range of possible values of 0 . . . N−1, and thus requires log 2(N) bits, e.g., 2 bits for N=4. In one embodiment Q is signalled in MIB carried by PBCH. In another embodiment Q is signalled in RMSI (e.g. SIB1) associated with the DRS.

A difference from legacy solutions is that the QCLx always starts at QCL0 for each DRS burst. This can be seen from a comparison between FIG. 2 and FIG. 1. This can be advantageous from a gNB perspective for the case if beamforming is applied to the SS/PBCH blocks in that the order of the beam sweep is the same for each DRS burst regardless of whether or not the DRS burst is shifted in time due to LBT.

Figure 3:
FIG. 3 schematically illustrates examples of different SS/PBCH positions and their respective SS/PBCH block indices and QCL indices for a case where two blocks are provided.

FIG. 3 schematically illustrates examples of different SS/PBCH positions and their respective SS/PBCH block indices and QCL indices for a case where two blocks are provided. The number of actually transmitted SS/PBCH blocks M may be signalled to the UE. In the examples in FIGS. 1 and 2, the value M=4 would be signalled. The value M can be signalled using the remaining bits of ssb-PositionsInBurst. This can help the UE skip detections of SS/PBCH blocks once it has detected the M SS/PBCH blocks. An example with M=2 is shown in FIG. 3.

Figure 4:
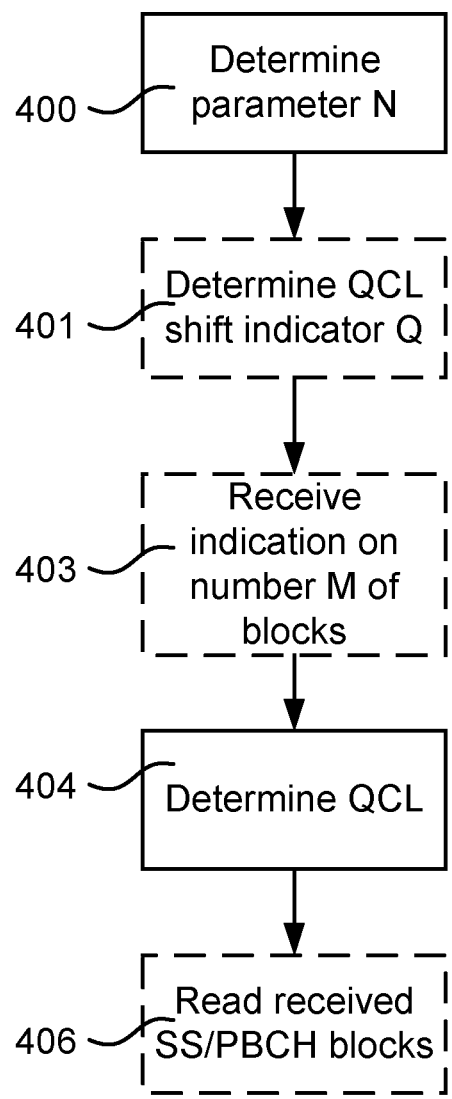
FIG. 4 is a flow chart illustrating a method according to an embodiment.

FIG. 4 is a flow chart illustrating a method according to an embodiment. The method is implemented in a wireless transceiver device arranged to operate in a cellular wireless communication network and capable of operating in an unlicensed spectrum where listen-before-talk is employed. The method comprises receiving 400 a parameter N, for the unlicensed operation, indicative on provision of synchronisation signal blocks. The receiving 400 of the parameter N may comprise receiving at least a part of the parameter N from a System Information Block, SIB. For example, the at least part of the parameter N is conveyed in a field used for ssb-PositionInBurst of a ServingCellConfigCommonSIB. Alternatively, the receiving 400 of the parameter N is performed through user-specific Radio Resource Control signalling.

Optionally, the method may comprise receiving 401 a QCL shift indicator Q. The receiving 401 of the QCL shift indicator Q may be made through a SIB, Alternatively, the receiving 401 of the QCL shift indicator Q may comprise receiving the QCL shift indicator Q through user-specific Radio Resource Control signalling.

Optionally, the method may comprise receiving 403 an indication of a number M of transmitted SS/PBCH blocks per burst. The receiving 403 of the indication of the number M may comprise receiving the number M from a System Information Block, SIB. The number M may be conveyed in a field used for ssb-PositionInBurst of a ServingCellConfigCommonSIB. Alternatively, the receiving 403 of the number M may be made through user-specific Radio Resource Control signalling.

The method includes determining 404 quasi-co-location, QCL, for one or more synchronisation signal and physical broadcast channel, SS/PBCH, blocks having a synchronisation signal block index n, by determining a second index, e.g. effective SS/PBCH block index I, for the one or more SS/PBCH blocks by applying a modulo operation on the first index, e.g. the SS/PBCH block index n, respectively, based on the parameter N, where QCL is determined to occur if the second indices, e.g. effective SS/PBCH block indices, coincide. The receiving of the first index, e.g. SS/PBCH block index n, may comprise receiving at least a part of the index n from a Physical Broadcast Channel payload.

The determining 404 of the QCL may according to one embodiment comprise determining desired the second index from transmission history, determining the second index, e.g., effective SS/PBCH block index I, for a received SS/PBCH block as the first index modulo the parameter N, e.g. SS/PBCH block index n modulo N, and comparing the second indices, e.g. the effective SS/PBCH block indices.

The determining 404 of the QCL may in cases where the QCL shift indicator is available comprise determining desired second index from transmission history, determining the second index for a received SS/PBCH block as the first index modulo the parameter, e.g. SS/PBCH block index n modulo N, minus the received QCL shift Q when the second index becomes positive and as the first index modulo the parameter minus the received QCL shift Q plus the parameter N otherwise, and comparing the second indices.

The method includes reading 406 received SS/PBCH blocks based on the first indices, e.g. SS/PBCH block indices, to determine frame timing.

Figure 5:
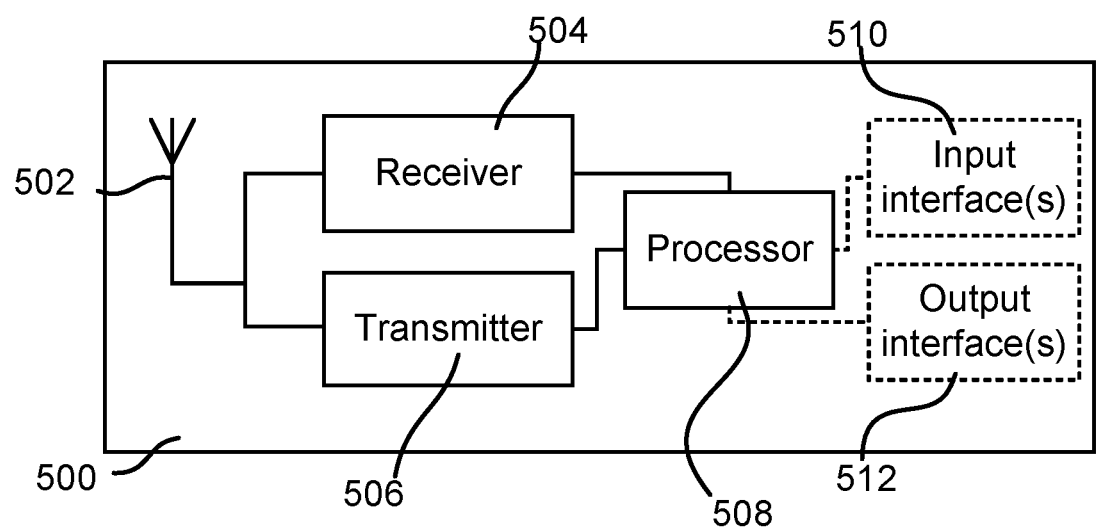
FIG. 5 is a block diagram schematically illustrating a wireless transceiver device according to an embodiment.

FIG. 5 is a block diagram schematically illustrating a wireless transceiver device 500 according to an embodiment, for example a User Equipment, UE. The wireless transceiver device 500 comprises an antenna arrangement 502, a receiver 504 connected to the antenna arrangement 502, a transmitter 506 connected to the antenna arrangement 502, a processing element 508, one or more input interfaces 510 and one or more output interfaces 512. The processing element 508, which may comprise one or more circuits, may comprise a signal handling circuit arranged to perform the method according to what has been demonstrated above. The interfaces 510, 512 can be user interfaces and/or signal interfaces, e.g. electrical or optical. The wireless transceiver device 500 is arranged to operate in a cellular communication network, including operation in unlicensed spectrum. In particular, by the processing element 508 being arranged to perform the embodiments demonstrated with reference to FIGS. 1 to 4, the wireless transceiver device 500 is capable of determining QCL in the unlicensed spectrum environment where there is an uncertainty whether the channel is clear for a frame, and the SS/PBCH blocks may not be provided in the same way as for the licensed spectrum environment. The processing element 508 can also fulfil a multitude of tasks, ranging from signal processing to enable reception and transmission since it is connected to the receiver 504 and transmitter 506, executing applications, controlling the interfaces 510, 512, etc.

Figure 6:
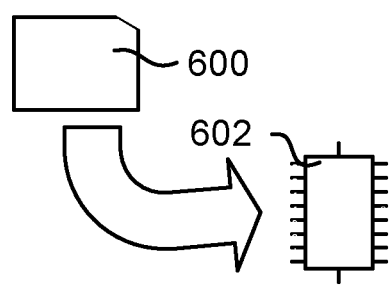
FIG. 6 schematically illustrates a computer-readable medium and a processing device.

The methods according to the present disclosure are suitable for implementation with aid of processing means, such as computers and/or processors, especially for the case where the processing element 508 demonstrated above comprises a processor handling the method demonstrated with reference to FIG. 4. Therefore, there is provided computer programs, comprising instructions arranged to cause the processing means, processor, or computer to perform the steps of any of the methods according to any of the embodiments described with reference to FIG. 1 to 4. The computer programs preferably comprise program code which is stored on a computer readable medium 600, as illustrated in FIG. 6, which can be loaded and executed by a processing means, processor, or computer 602 to cause it to perform the methods, respectively, according to embodiments of the present disclosure, preferably as any of the embodiments described with reference to FIGS. 1 to 4. The computer 602 and computer program product 600 can be arranged to execute the program code sequentially where actions of the any of the methods are performed stepwise or be arranged to perform the actions on a real-time basis. The processing means, processor, or computer 602 is preferably what normally is referred to as an embedded system. Thus, the depicted computer readable medium 600 and computer 602 in FIG. 6 should be construed to be for illustrative purposes only to provide understanding of the principle, and not to be construed as any direct illustration of the elements.

According to one example, there is provided a method implemented in a wireless transceiver device arranged to operate in a cellular wireless communication network and capable of operating in an unlicensed spectrum where listen-before-talk is employed. The method comprises receiving a parameter N, for the unlicensed operation, indicative on provision of synchronisation signal blocks, and determining quasi-co-location, QCL, relationship between one or more synchronisation signal and physical broadcast channel, SS/PBCH, blocks each having a synchronisation signal block index n, by determining effective SS/PBCH block index I for the one or more SS/PBCH blocks by applying a modulo operation on the SS/PBCH block index n, respectively, based on the parameter N, where the QCL relationship is determined to occur if the effective SS/PBCH block indices coincide.

The method may comprise reading received SS/PBCH blocks based on the SS/PBCH block indices to determine frame timing.

The receiving of the SS/PBCH block index n may comprise receiving at least a part of the index n from a Physical Broadcast Channel payload. Alternatively, the receiving of the SS/PBCH block index may comprise receiving at least a part of the index n implicitly from the identifier of a reference signal sequence associated with the Physical Broadcast Channel.

The parameter N may comprise receiving at least a part of the parameter N from a System Information Block, SIB. The at least part of the parameter N may be conveyed in a field used for ssb-PositionInBurst of a ServingCellConfigCommonSIB.

The receiving of the parameter N may comprise receiving the parameter N through user-specific Radio Resource Control signalling.

The determining of the QCL relationship may comprise determining one or more desired effective SS/PBCH block index(es) from transmission history, determining effective SS/PBCH block index I for a received SS/PBCH block as SS/PBCH block index n modulo N, and comparing the effective SS/PBCH block indices.

The method may comprise receiving a QCL shift indicator Q, and wherein the determining of the QCL relationship may comprise determining one or more desired effective SS/PBCH block index(es) from transmission history, determining effective SS/PBCH block index I for a received SS/PBCH block as SS/PBCH block index n modulo N minus the received QCL shift Q when the effective SS/PBCH block index I becomes positive and as SS/PBCH block index n modulo N minus the received QCL shift Q plus the parameter N otherwise, and comparing the effective SS/PBCH block indices. The receiving of the QCL shift indicator Q may comprise receiving the QCL shift indicator Q through user-specific Radio Resource Control signalling. The receiving of the QCL shift indicator Q may comprise receiving the QCL shift indicator Q through broadcast system information.

The method may comprise receiving an indication of a number M of transmitted SS/PBCH blocks per burst. The receiving of the indication of the number M may comprise receiving the number M from a System Information Block, SIB. The number M may be conveyed in a field used for ssb-PositionInBurst of a ServingCellConfigCommonSIB. Alternatively, the receiving of the indication of the number M may comprise receiving the number M through user-specific Radio Resource Control signalling.

According to one example, there is provided a computer program comprising instructions which, when executed on a processor of a wireless transceiver device, causes the wireless transceiver device to perform the method according to the example above.

According to one example, there is provided a wireless transceiver device arranged to operate in a cellular wireless communication network and capable of operating in an unlicensed spectrum where listen-before-talk is employed. The wireless transceiver device comprises a transceiver arranged to receive and transmit signals, including receiving synchronisation signals and control signals, and a signal handling circuit arranged to perform the method according to the example above.

An advantage of some embodiments is that the UE can determine the frame timing of the cell using legacy-like mechanisms, thus providing a solution without increasing the complexity of procedures such as RRM measurements, RLM and RACH that relies on the detected SS/PBCH index.

The invention claimed is:

1. A method implemented in a wireless transceiver device arranged to operate in a cellular wireless communication network and capable of operating in a spectrum where listen-before-talk is employed, the method comprising
determining a first parameter indicative on provision of synchronisation signal blocks, the determining of the first parameter comprising receiving at least a part of the first parameter from a master information block (MIB) or physical broadcast channel (PBCH) payload, or a combination of the two; and
determining a quasi-co-location (QCL) relationship between two or more synchronisation signal and physical broadcast channel (SS/PBCH) blocks of a plurality of SS/PBCH blocks, each SS/PBCH block having a first index, the plurality of SS/PBCH blocks comprising at least a first SS/PBCH block and a second SS/PBCH block, the QCL relationship being determined to occur if at least a first result of a modulo operation of the first index of the first SS/PBCH block and the first parameter coincides with a second result of the modulo operation of the first index of the second SS/PBCH block and the first parameter.

2. The method of claim 1, comprising determining a frame timing based on the first index associated with a detected SS/PBCH block.

3. The method of claim 1, wherein the determining of the QCL relationship comprises:
determining one or more desired second indices from transmission history;
determining a second index for each one of two or more received SS/PBCH blocks as the first index modulo the first parameter; and
comparing the second indices associated with at least two of the two or more received SS/PBCH blocks.

4. The method of claim 1, comprising determining a QCL shift indicator, and wherein the determining of the QCL relationship comprises:
determining one or more desired second indices from transmission history;
determining a second index for each one of two or more received SS/PBCH blocks as the first index modulo the first parameter minus the determined QCL shift when the second index becomes positive and as the first index modulo the first parameter minus the determined QCL shift plus the first parameter otherwise; and
comparing the second indices associated with at least two of the two or more received SS/PBCH blocks.

5. The method of claim 4, wherein the determining of the QCL shift indicator comprises receiving the QCL shift indicator through user-specific Radio Resource Control signalling.

6. The method of claim 4, wherein the determining of the QCL shift indicator comprises receiving the QCL shift indicator through broadcast system information.

7. The method of claim 1, comprising receiving an indication of a number of transmitted SS/PBCH blocks per burst.

8. The method of claim 7, wherein the receiving of the indication of the number comprises receiving the number from a System Information Block (SIB).

9. The method of claim 8, wherein the number is conveyed in a field used for ssb-PositionInBurst of a ServingCellConfigCommonSIB.

10. The method of claim 7, wherein the receiving of the indication of the number comprises receiving the number from the MIB or PBCH payload, or the combination of the two.

11. The method of claim 7, wherein the receiving of the indication of the number comprises receiving the number through user-specific Radio Resource Control signalling.

12. A wireless transceiver device arranged to operate in a cellular wireless communication network and capable of operating in a spectrum where listen-before-talk is employed, the wireless transceiver device comprising:
    a transceiver arranged to receive and transmit signals, including receiving synchronisation signals and control signals; and
    a signal handling circuit arranged to:
        determine a first parameter indicative on provision of synchronisation signal blocks, the determining of the first parameter comprising receiving at least a part of the first parameter from a master information block (MIB) or physical broadcast channel (PBCH) payload, or a combination of the two; and
        determine a quasi-co-location (QCL) relationship between two or more synchronisation signal and physical broadcast channel (SS/PBCH) blocks of a plurality of SS/PBCH blocks, each SS/PBCH block having a first index, the plurality of SS/PBCH blocks comprising at least a first SS/PBCH block and a second SS/PBCH block, the QCL relationship being determined to occur if at least a first result of a modulo operation of the first index of the first SS/PBCH block and the first parameter coincides with a second result of the modulo operation of the first index of the second SS/PBCH block and the first parameter.

13. The wireless transceiver device of claim 12, wherein the signal handling circuit is further arranged to determine a frame timing based on the first index associated with a detected SS/PBCH block.

14. The wireless transceiver device of claim 12, wherein determining the QCL relationship comprises:
    determining one or more desired second indices from transmission history;
    determining a second index for each one of two or more a received SS/PBCH blocks as the first index modulo the first parameter; and
    comparing the second indices associated with at least two of the two or more received SS/PBCH blocks.

15. The wireless transceiver device of claim 12, wherein the signal handling circuit is further arranged to determine a QCL shift indicator, and wherein the determining of the QCL relationship comprises:
    determining one or more desired second indices from transmission history;
    determining a second index for each one of two or more received SS/PBCH blocks as the first index modulo the first parameter minus the determined QCL shift when the second index becomes positive and as the first index modulo the first parameter minus the determined QCL shift plus the first parameter otherwise; and
    comparing the second indices associated with at least two of the two or more received SS/PBCH blocks.

16. The wireless transceiver device of claim 15, wherein determining the QCL shift indicator comprises receiving the QCL shift indicator through user-specific Radio Resource Control signalling.

17. The wireless transceiver device of claim 15, wherein determining the QCL shift indicator comprises receiving the QCL shift indicator through broadcast system information.

18. The wireless transceiver device of claim 12, wherein the signal handling circuit is further arranged to receive an indication of a number of transmitted SS/PBCH blocks per burst.

19. The wireless transceiver device of claim 18, wherein the receiving of the indication of the number comprises receiving the number from a System Information Block (SIB).

20. The wireless transceiver device of claim 19, wherein the number is conveyed in a field used for ssb-PositionInBurst of a ServingCellConfigCommonSIB.

21. The wireless transceiver device of claim 18, wherein the receiving of the indication of the number comprises receiving the number from the MIB or PBCH payload, or the combination of the two.

22. The wireless transceiver device of claim 18, wherein receiving the indication of the number comprises receiving the number through user-specific Radio Resource Control signalling.

* * * * *